(12) United States Patent
Vignisson et al.

(10) Patent No.: US 8,504,615 B2
(45) Date of Patent: Aug. 6, 2013

(54) METHOD AND APPARATUS FOR NAVIGATION AND USE OF A COMPUTER NETWORK

(75) Inventors: Vidar Vignisson, San Diego, CA (US); Will Von Reis, Del Mar, CA (US)

(73) Assignee: Saban Digital Studios, LLC, Los Angeles, CA (US)

( * ) Notice: Subject to any disclaimer, the term of this patent is extended or adjusted under 35 U.S.C. 154(b) by 8 days.

(21) Appl. No.: 12/395,616

(22) Filed: Feb. 27, 2009

(65) Prior Publication Data

US 2009/0254617 A1   Oct. 8, 2009

Related U.S. Application Data

(60) Provisional application No. 61/033,413, filed on Mar. 3, 2008.

(51) Int. Cl.
*G06F 15/16* (2006.01)

(52) U.S. Cl.
USPC .................................................... 709/204

(58) Field of Classification Search
USPC ................ 709/203, 204, 205, 208, 212, 216, 709/223, 224, 227
See application file for complete search history.

(56) References Cited

U.S. PATENT DOCUMENTS

| | | | | |
|---|---|---|---|---|
| 5,440,699 A * | 8/1995 | Farrand et al. | ................. | 715/740 |
| 5,583,993 A * | 12/1996 | Foster et al. | ................. | 709/205 |
| 5,634,018 A * | 5/1997 | Tanikoshi et al. | ............. | 715/751 |
| 5,649,104 A * | 7/1997 | Carleton et al. | ............... | 709/204 |
| 5,706,502 A * | 1/1998 | Foley et al. | .................... | 717/120 |
| 5,754,830 A * | 5/1998 | Butts et al. | ..................... | 719/311 |
| 5,765,152 A * | 6/1998 | Erickson | ................. | 1/1 |
| 5,778,368 A * | 7/1998 | Hogan et al. | ........................ | 1/1 |
| 5,781,909 A * | 7/1998 | Logan et al. | ......................... | 1/1 |
| 5,809,247 A * | 9/1998 | Richardson et al. | .......... | 709/218 |
| 5,944,791 A * | 8/1999 | Scherpbier | ..................... | 709/218 |
| 7,130,888 B1 * | 10/2006 | Hickman et al. | ............... | 709/208 |
| 7,133,895 B1 * | 11/2006 | Lee et al. | ...................... | 709/204 |
| 7,149,776 B1 * | 12/2006 | Roy et al. | ...................... | 709/205 |
| 7,305,439 B2 * | 12/2007 | Qian et al. | ..................... | 709/205 |
| 7,660,899 B2 * | 2/2010 | Gavrilescu et al. | ............ | 709/227 |
| 7,664,740 B2 * | 2/2010 | Starbuck et al. | ............... | 707/706 |
| 7,725,540 B2 * | 5/2010 | Roberts et al. | ................ | 709/205 |
| 7,908,321 B1 * | 3/2011 | Rust | ............................. | 709/204 |
| 7,958,082 B2 * | 6/2011 | Mizrachi et al. | ............... | 707/600 |
| 2001/0035976 A1 * | 11/2001 | Poon | ............................. | 358/1.15 |
| 2002/0138624 A1 * | 9/2002 | Esenther | ....................... | 709/227 |
| 2003/0097406 A1 * | 5/2003 | Stafford | ........................ | 709/204 |

(Continued)

OTHER PUBLICATIONS

WEb Ex Web Meetings for Dummies by Nancy Stevenson Wiley Publishing,Inc. Copyright 2005 by wiley Publishings, Inc Indianapolis Indiana.*

*Primary Examiner* — Sargon Nano
(74) *Attorney, Agent, or Firm* — Arent Fox LLP

(57) ABSTRACT

The system provides a method and apparatus for navigation and use of a computer network. The system allows multiple users to simultaneously explore a network in groups of two or more. This capability allows one of the users to be a leader of the exploration and the leader can change during the exploration as desired. A user can also save an exploration session and share it with others, so that others can recreate the experience of the first user automatically. The system also allows for the easy creation of circles of network friends where content and information can be easily shared.

4 Claims, 7 Drawing Sheets

U.S. PATENT DOCUMENTS

| | | | |
|---|---|---|---|
| 2003/0225836 A1* | 12/2003 | Lee et al. | 709/205 |
| 2004/0001104 A1* | 1/2004 | Sommerer et al. | 345/811 |
| 2004/0225716 A1* | 11/2004 | Shamir et al. | 709/204 |
| 2005/0086230 A1* | 4/2005 | Frees et al. | 707/10 |
| 2005/0246422 A1* | 11/2005 | Laning | 709/205 |
| 2006/0089978 A1* | 4/2006 | Lee et al. | 709/219 |
| 2006/0200520 A1* | 9/2006 | Vernon et al. | 709/204 |
| 2007/0185959 A1* | 8/2007 | Huck et al. | 709/204 |
| 2007/0214423 A1* | 9/2007 | Teplov et al. | 715/751 |
| 2007/0245249 A1* | 10/2007 | Weisberg | 715/758 |
| 2007/0265873 A1* | 11/2007 | Sheth et al. | 705/1 |
| 2007/0282703 A1* | 12/2007 | Sharpe et al. | 705/26 |
| 2008/0052377 A1* | 2/2008 | Light | 709/218 |
| 2008/0120501 A1* | 5/2008 | Jannink et al. | 713/163 |
| 2008/0162637 A1* | 7/2008 | Adamczyk et al. | 709/204 |
| 2008/0215995 A1* | 9/2008 | Wolf | 715/758 |
| 2009/0177977 A1* | 7/2009 | Jones et al. | 715/753 |
| 2009/0199275 A1* | 8/2009 | Brock et al. | 726/4 |

* cited by examiner

METHOD AND APPARATUS FOR NAVIGATION AND USE OF A COMPUTER NETWORK

CROSS REFERENCE TO RELATED APPLICATIONS

This application claims the benefit of U.S. Provisional Application No. 61/033,413, filed Mar. 3, 2008, which is herein incorporated by reference in its entirety.

BACKGROUND OF THE SYSTEM

1. Field of the Invention

The invention relates to a system for the monitoring, filtering, and approving of content from one or more content sources. In particular, the system provides a method for a parent or other custodian to set limits and parameters for a child to access content on a network.

2. Background of the Invention

The ability to access information via networks such as the Internet has become an accepted part of everyday life. The ability to interact with digital knowledge sources is of such fundamental importance that parents and schools have encouraged computer literacy in children of younger and younger age. Accordingly, young children have regular and ongoing access to computers and in a typical home or school, to information networks such as the Internet.

This increased computer and Internet use by children creates a challenge for parents, who may wish to monitor or filter the information to which a child has access. Moreover, a parent may determine that a child should spend more time using a personal computing device for one thing (such as doing homework) and less time using it for other things (such as playing games). Unfortunately, a modem personal computing device typically does not provide a parent with the controls that would allow the parent to define a policy relating to how a child may use the personal computing device.

There have been some attempts to provide a children safe computing and browsing environment. In some cases, filtering software is provided that enables a parent to block certain web sites from access without a password. In theory, when the parent is surfing the web, the parent can disable the feature or supply the required password when blocked content is desired. The system may also include an ability to search for certain words and phrases and block websites that contain those phrases. The child is prevented from defeating the system due to lack of knowledge of the password.

A disadvantage of such systems is the limited navigation capabilities of the systems. Navigation is geared to individual use and exploring. It is not possible in current systems to provide a shared or joint navigation experience. Another disadvantage of prior art systems is the inability to recreate network use and exploring sessions for reuse by an individual or for sharing with others.

BRIEF SUMMARY OF THE SYSTEM

The system provides a method and apparatus for navigation and use of a computer network. The system allows multiple users to simultaneously explore a network in groups of two or more. This capability allows one of the users to be a leader of the exploration and the leader can change during the exploration as desired. A user can also save an exploration session and share it with others, so that others can recreate the experience of the first user automatically. The system also allows for the easy creation of circles of network friends where content and information can be easily shared.

DETAILED DESCRIPTION OF THE SYSTEM

The present system provides a method and apparatus for navigation and use of a computer network. In the following description, the system is described in connection with an embodiment that manages content to be accessed by children on a network. However, the system is not limited to this embodiment and has application to any situation where content is desired to be managed for a specific audience. The system may be implemented in a child-oriented computer such as is described in U.S. patent application Ser. No. 12/037,082 entitled "Child-Oriented Computer System" filed on Feb. 25, 2008 and incorporated by reference herein in its entirety.

EXAMPLE EMBODIMENT

Figure 1:
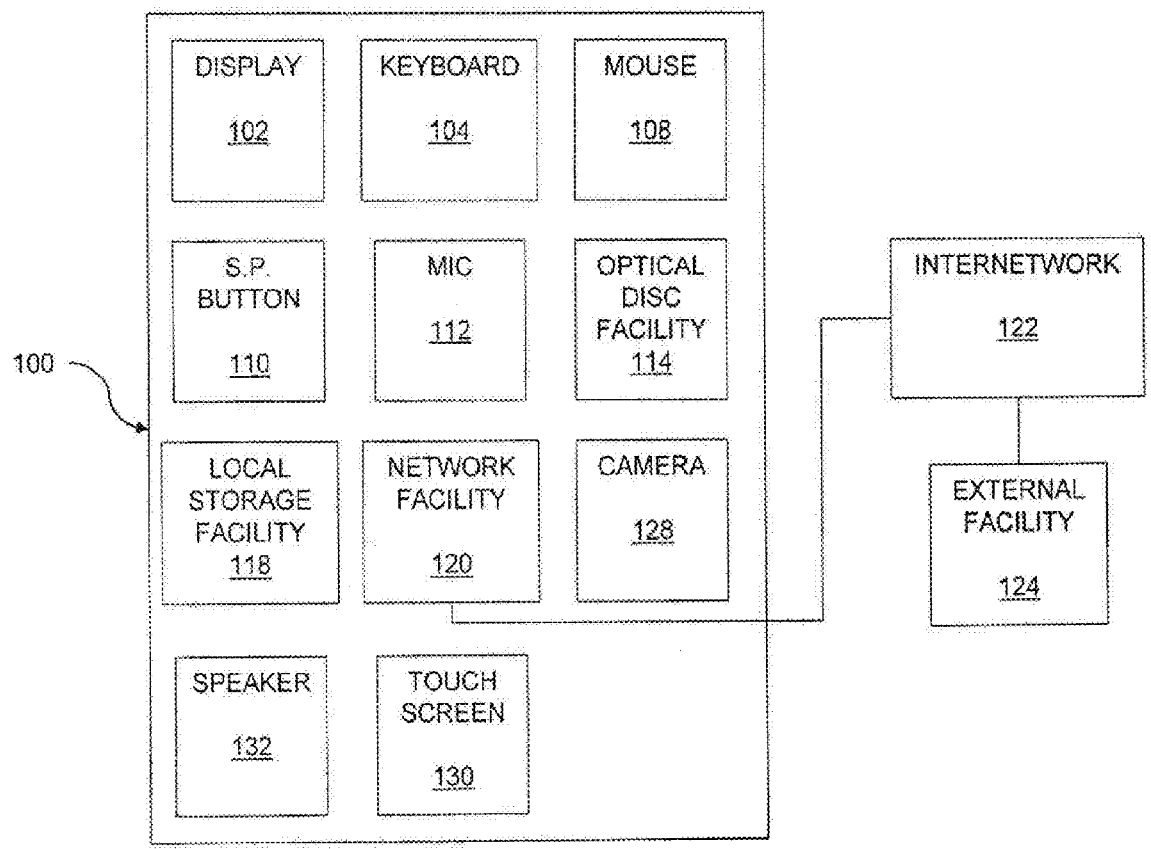
FIG. 1 is a block diagram of an example computer system in an embodiment of the system.

The system contemplates a user (in one embodiment a child) accessing a network using a computing facility of some type. Referring to FIG. 1, in some embodiments, a computing facility 100 may comprise a commercial, off-the-shelf (COTS) computing facility, such as and without limitation a personal computer (PC), a cell phone, a Sony PSP2, and the like. The COTS computing facility may run an operating system such as Linux or a variant thereof, a Microsoft Windows-brand operating system, Mac OS X, and so forth. In the preferred embodiment, the computing facility 100 may comprise a COTS PC.

In embodiments, the computing facility 100 according to the principles of the present invention may comprise the following elements: a display 102; a keyboard 104; a mouse 108; a special-purpose button 110; a microphone 112; a optical disc facility 114; a local storage facility 118; a network facility 120; a camera 128; a touch screen 130; a speaker 132; and so forth. The computing facility may be operatively coupled to a network 122, such as the Internet. The network 122 may, in turn, be operatively coupled to an external facility 124, which is described in detail hereinafter in reference to other figures.

In embodiments, the internal components of the computing facility 100 may include a primary motherboard. The motherboard may include a central processing unit (CPU); RAM memory (which may be the local storage facility 118), such as a RIMM chip, SRAM, DRAM, a BIOS chip; a PCI slot; an Accelerated Graphics Port; a ZIF socket; a disk controller, which may be directed at controlling a hard drive or floppy drive; an additional chipset; an expansion slot; a parallel port;

a PS/2 port; a serial port; an ATX power connector; a fan; a battery; and so forth. The motherboard may be connected to an external power supply in order to receive power from a standard wall electrical outlet. Additional internal components may include a media drive (of which the optical disc facility 114 may be comprised) and/or ports, such as and without limitation a compact disc player/recorder, a digital video disc player/recorder, removable disk drives (e.g. a USB jump drive, memory card or the like). The internal components may connect with multimedia components, such as an audio speaker and/or the display 102 (which may comprise an LCD, plasma, CRT, LED, holographic, or other monitor or display device).

Example Software Embodiment

Figure 2:
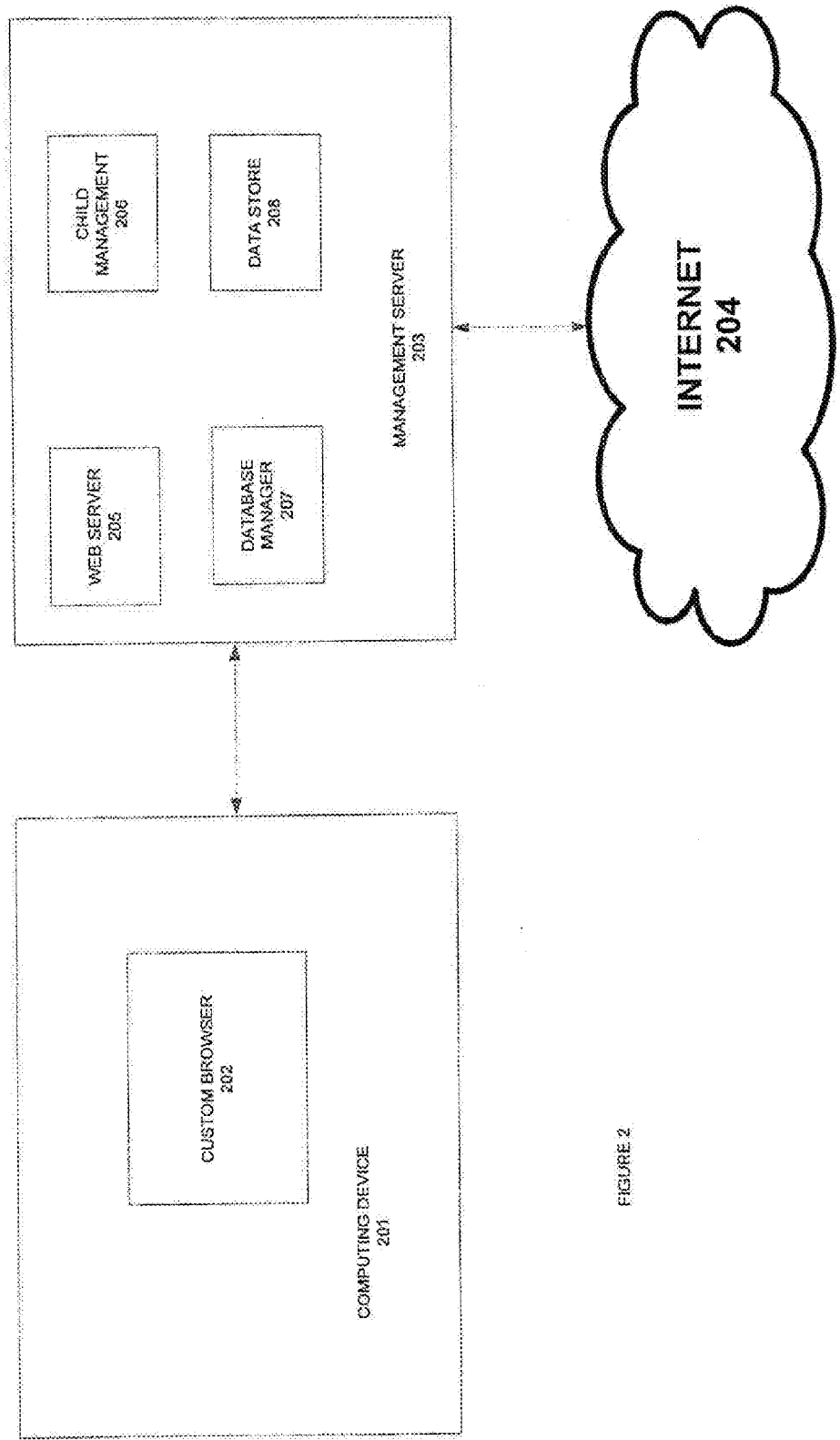
FIG. 2 is a block diagram of an example embodiment of a managed network experience.

In one embodiment the system uses a custom browser to provide the interface between the user and the Internet. The browser controls all requests and replies so that the user has a layer of protection between himself and the Internet. FIG. 2 illustrates an example implementation of a software embodiment of the child-oriented computing system. In this embodiment, the child-oriented computing system is provided by a piece of software downloaded from a management unit to a computing device wherein one or more children use the downloaded software when installed to browse content. In particular, the system may include a computer 201 that is used by the children to access the Internet. (The computer 201 may be any suitable computing device that is capable of accessing the Internet and may be the example embodiment described in FIG. 1). A typical browser (e.g. Internet Explorer, Netscape, Mozilla, etc.) is replaced with a custom browser 202 that includes browser functions such as searching, multi-media presentation, favourite lists, browsing, chatting, emailing, social networking functions, and the like and whose requests and replies are directed to and from the Internet 204 via a managing server 203. Once installed on the computing device 201, the browser application 202 controls the browsing and web surfing activities of each child that uses the computing device and logs the activities of each child so that the activities can be reviewed by a parent as described in more detail below. In another embodiment, the system is implemented as an add on to a browser, such as for a Firefox browser. In this embodiment, the system functionality is added to an existing browser instead of replacing the browser. This approach can be extended to Linux systems.

The system may further comprise a management server 203 such as one or more server computers in an exemplary embodiment that can be accessed by the computing device over a network, such as the Internet or other network. The computing device 201 may establish a session using the custom browser 202 and then interact with the management server 203 in order to at least: 1) update the browser application; 2) change parental settings; 3) review and approve particular web pages and/or categories of content; 4) download web pages containing the browsing activities and selected content for a particular child; 5) download content categories when the child is browsing using the browser application; and/or 6) provide product recommendations to a parent based on a child's browsing activities. The computing device 201 and management server 203 may also interact to perform other functions and operations as described below in more detail.

The management server 203 may further comprise its own web server 205 that serves web pages to the computing device 201 or downloads content to the browser application 202 among other functions. The management server 203 may also include a child-oriented content manager application 206 that manages one or more pieces of content that may be browsed by the browser application, and a database management unit 207 that manages the data in a data store 208 such as a database system. The data store 208 may store the data associated with the system such as the user data (child and parent data), content data, category data, web page content and the like. Data store 208 may also store a list of approved URL's, web pages, web sites, or other content that may be accessed by a user via the network.

Approved Content

In one embodiment, the system operates to limit the content to which a child has access to approved content. That is, content that has already been reviewed and deemed safe by system administrators, by an automatic approval system, by parental approval, or by some other method of approving the content. The system maintains a database of approved content that can include web pages, web sites, video, audio, photographs, graphic images, and other retrievable content. Thus, the system assumes a database of approved content that may be added to over time as new web pages, sites, and media content are created.

Initially, a database of approved content is assembled. In one embodiment, the database is defined by levels (e.g. Level 1 and Level 2). Level 1 is a review of individual media items, i.e. review of a web page, a video, a photo, or any other individual media item. Level 2 review is a review of a collection of media items, i.e. i. reviewing search results and reordering or adding items to the search results. (This is what we call categorization) or ii. reviewing a web domain, evaluating all the pages belonging to a domain, such as nick.com and determining whether every page in the domain should be approved or rejected. Level 2 is generated by incorporating websites from child friendly content sources (e.g. DMOZ, kids directories, Nickelodeon, Disney, etc.). Next, a category list is defined of the categories that are most relevant for children (entertainment, education, etc.). The category list is then populated with the collected content. In one embodiment, the categories were either populated with what was considered the best content or were populated with a ranking, ordering, or weight for each content source. In one embodiment, an editor selects a category (Zebra for example) and the system algorithmically finds the websites believed to be related to the category prioritizes the relevancy of such content based on the search algorithm. At the same time, the system fetches photos and other media content from the creative commons library at FlickR that were tagged with this category and pull videos from sites such as YouTube that met this category key word. The editor would then review the list of websites, photos and videos and pick the most relevant ones to populate a top level of results (e.g. 48 websites, 18 videos and 18 photos). The editor will also rank or order the content so that the most relevant appear in the top positions of a search for that category. The system may perform spidering in the same manner as current search engines.

The system then looks at the individual pages, sites, videos, sound files, photos, images, etc. and approves them on a one-by-one basis. This is the Level 1 category. This is for the content that was not considered to be the top level in the Level 2 exercise above. At this stage, the system may also assign category tags to the content or may rely on the Level 2 categorization. The Level 1 category also includes blocked content that results from a request for unapproved content.

Initially a database of approved content is assembled.

i. from spidering and feeding the results of the spidering to editors for review (i.e. Level 1 review)

ii. from editors searching using commercial search engine or web site search capabilities for individual sites and adding individual items to the database of content iii. from editors learning of other interesting online media items (from word of mouth, TV, magazines, newspapers, etc.) and adding them individually to the database of content iv. When kids encounter pages through the KidZui browser that have not been reviewed they are sent to editors for review.

v. The system periodically re-spiders web sites and tries to determine if they have changed sufficiently to require a re-review by editors. If it determines that a re-review is required, the webpage is placed in the editorial queue for review vi. The client reports problems playing videos that do not get played to the back-end server system and those videos get placed in the editorial queue vii. The client reports pages that do not get loaded, i.e. 404s, 500s etc., and those pages are also placed in the editorial queue Category lists are defined i. editors examine popular search terms and create categories based on them. These are used in search auto-completion ii. editors examine the search results for categories and if they deem them not sufficiently strong, they adjust order of results and the search for additional content to add to the database of approved content to improve the search results iii. The system examines popular categories and search terms and regularly spiders content from those sources The above is one example of how to build a database of approved content. However, any other suitable method may be utilized without departing from the scope and spirit of the system.

The system assumes a default content rating method that is deemed acceptable for all children. In one embodiment, the system assembles and adds content that is deemed safe for all children from the ages of three to eleven for example. However, parents may desire a stricter definition of acceptable safe content for their child. In other cases, the parent may wish to time limit access to all or some content, or to make the availability of all or some content conditional on some events or triggers. A parent may also wish to be notified of activity of the child on the network. The system provides a way to accomplish this goal. In addition, the system provides categories of content that parents may want to turn on or turn off for their child. For example, parents may want to turn off content related to reproduction.

Home Page

Figure 5:
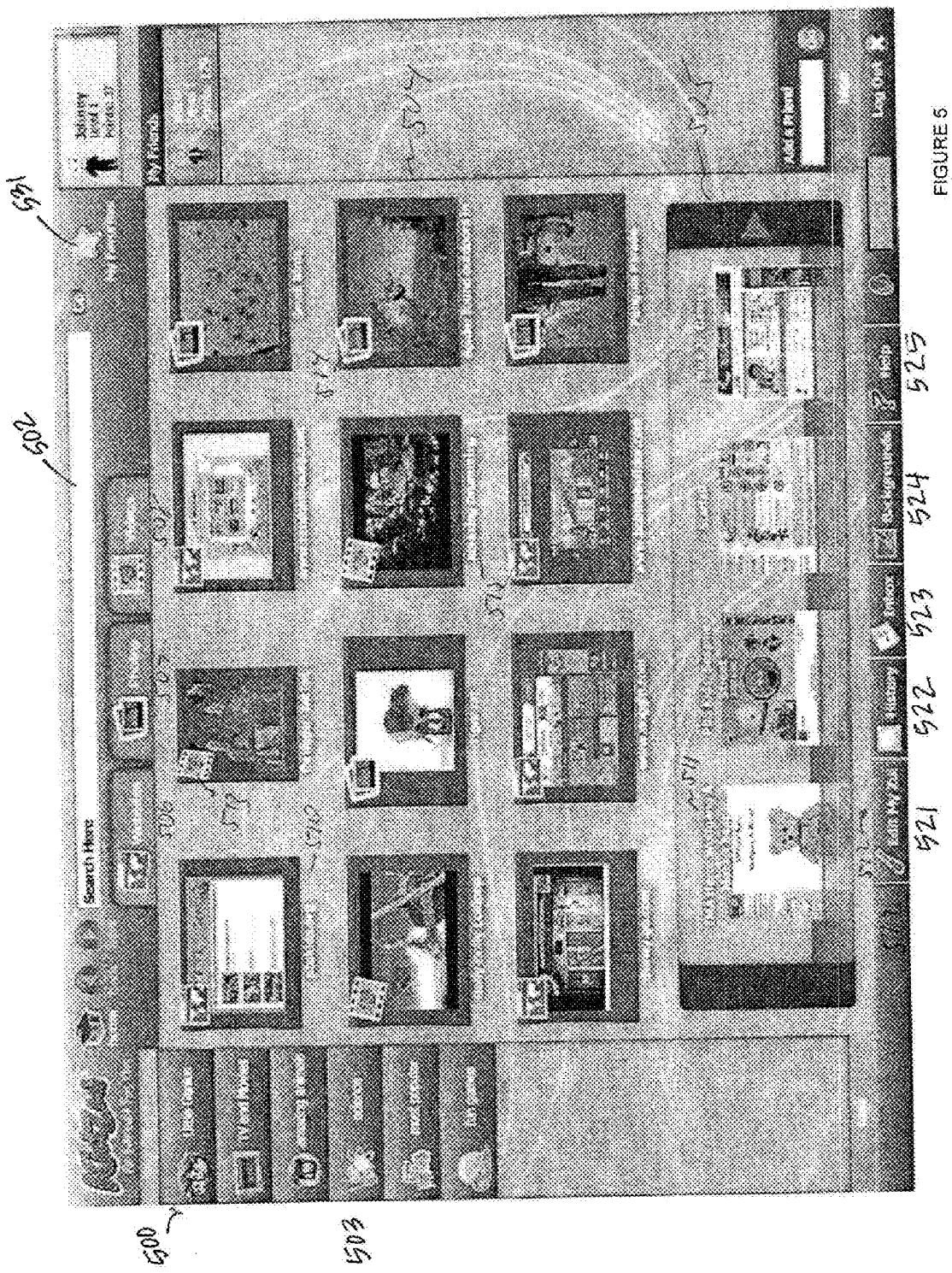
FIG. 5 illustrates an example home page of an embodiment of the system.

FIG. 5 is an example of a home page in an embodiment of the system. The home page 500 includes a number of different regions that present information to the child in an intuitive manner. A search bar 502 is located at the top of the page and is used to enter text based searches of network content. When a search is performed using the search box 502, the results are retrieved and sorted into their respective categories that are accessible via tabs 506, 507, and 508. In one embodiment, only approved content is presented in a search result listing so that the child is not disappointed that a search has yielded unviewable results. The home page includes a region 504 that presents a series of icons or thumbnails of content that is available to the user. Early in the use of the system by the child, the choices presented may be randomly generated. As the child's use history grows, the offerings in region 504 may be more specific to the child's interests.

The custom browser of the system includes the ability to easily separate data and types of media. For example, region 504 includes a number of icons, each having a tag in the upper left corner. This tag indicates the type of data that is presented. For example, tag 513 is a graphical filmstrip, indicating that the icon represents video data. Tag 514 is a photo, representing photographic or image data. Tag 515 is a world map, indicating that the data is a website from the worldwide web.

In one embodiment, these icons are changed over time. For example, in one embodiment, one of the icons appears to rotate and as it turns around a new content icon has taken its place. Even if the user is just viewing the home page, new content and ideas are presented to the user.

The home page may also include a region 505 that displays links to commercial or partner sites such as represented by icon 511 in region 505. This site is a commercial teddy bear vending site in the example given. The partner sites need not be vending sites, but can be associated child friendly sites such as Nickelodeon, Disney, etc.

Region 503 presents a series of tabs that lead to related content based on the title of the tab. This region can be populated automatically by the system based on preferences and history of the user. In other embodiments, this region can be populated by the user as desired. Some of the entries, such as "most popular" by be determined by the system and based on all users, all users of the same age and gender, or all users in the geographical area of the user. Selecting one of the tabs will populate region 504 with content options that are all related to the tab title.

If the user desires to view only a single type of content, the system includes taps 506, 507, and 508 for websites, photos, and videos, respectively. Clicking on one of these tabs replaces all of the icons with icons having the same type of corresponding content. By incorporating a photo viewer and video viewer into the browser, the system makes it easier for children to have a fulfilling computer experience without the need to load and execute separate applications for each type of content.

The home page 500 also includes a toolbar 512 that includes a number of options and customizing tools for the user. The user can call up an avatar editing tool 521 if the user desires to edit their avatar. The history tool 522 displays a listing of sites and content visited during the current session. Inbox 523 retrieves the users email inbox. Backgrounds 524 permits the user to select from a plurality of background choices of the home page and other presentation pages. The help tool 525 brings up a help page that can assist the child in learning about different features of the system.

Ratings

One of the features of the system is the ability to rate every piece of content and site using a graphical and customizable ratings interface. This allows the child greater ability to customize content by retrieving content based on a rating given by the child. It also greatly aids in the generation or presentation of content that is more likely to be pleasing to the child, since it will be based on actual revealed preferences Current web interfaces do not allow the rating of every piece of content as in the present system.

For each piece of content selected, the user has the opportunity to rate the content by tagging it via a ratings menu that appears with each piece of content. The rating choices are child directed and include iconic representations of the rating level that they represent. Example choices include best, worst, cool, lame, cute, fun, boring, and gross. The ratings can be updated at anytime and a history of the ratings can be maintained. In one embodiment, the content includes a metadata tag that records the most recent rating given the content by the user. In other embodiments, the user can click on multiple ratings choices and a histogram of the ratings clicks is maintained.

Friends Network

Figure 3:
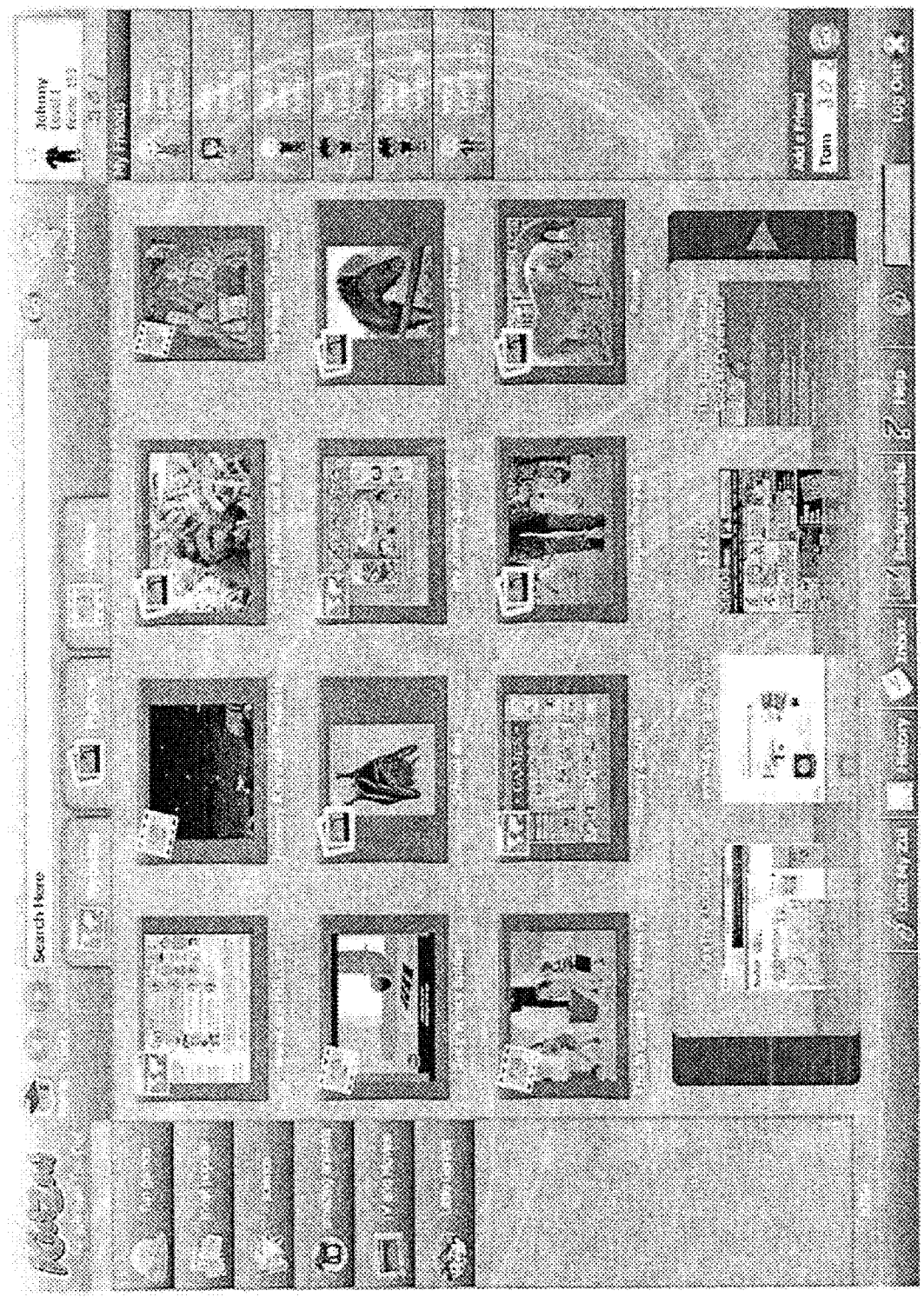
FIG. 3 illustrates an example of the friends feature of the system.

One of the features of the system is the ability to add friends (other users) that are then part of the friends list of a user. FIG. 3 illustrates an example of the friends feature of the system. A section of the user's interface page is the "My Friends" area

301. My Friends 301 includes a list of the current friends of the user. Each friend has an entry with the friend's user name, level, and number of points, as well as an image of that friends avatar. To add a friend, the user must know the user name of the potential friend. The user types the friend's user name into the Add a Friend box 302 and hits "Go". The friend is added to the My Friends list following a protocol described below.

Figure 4:
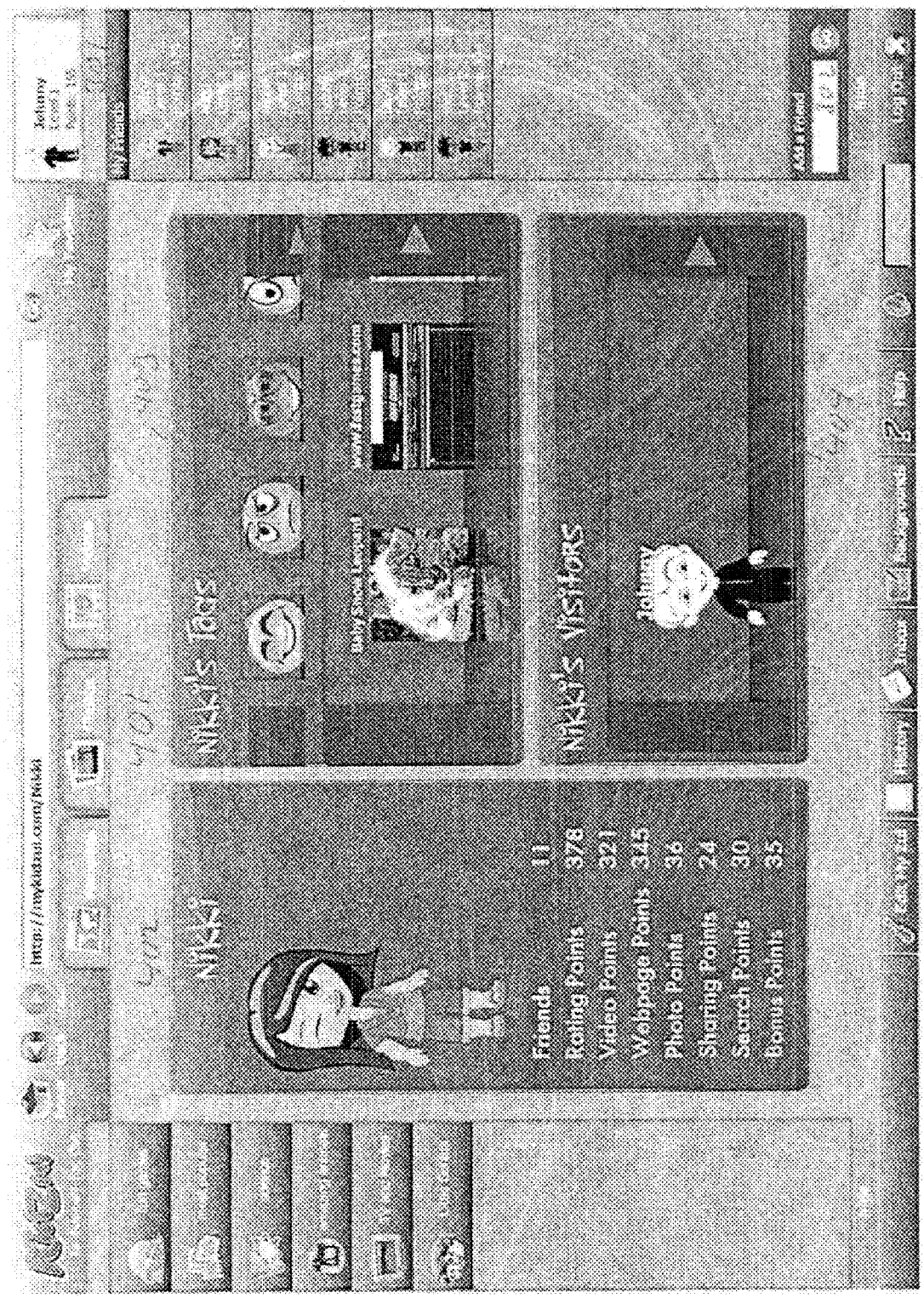
FIG. 4 illustrates the display when a friend has been selected.

FIG. 4 illustrates the display presentation when a user selects one of their friend's icons in area 301. The display shows a new area 401 that includes more detailed information about the friend. In this case, the user has selected a friend called Nikki and is presented with a more detailed profile in area 402. This displays a more thorough breakdown of the points of the friend, as well as indicating the number of friends of the selected person. Region 403 displays links to any content that Nikki has rated on the system. In one embodiment, clicking on one of the ratings icons in area 403 will filter the content links to show only those that have been rated accordingly. Area 404 identifies by name and avatar any other visitors of that friend.

Figure 6:
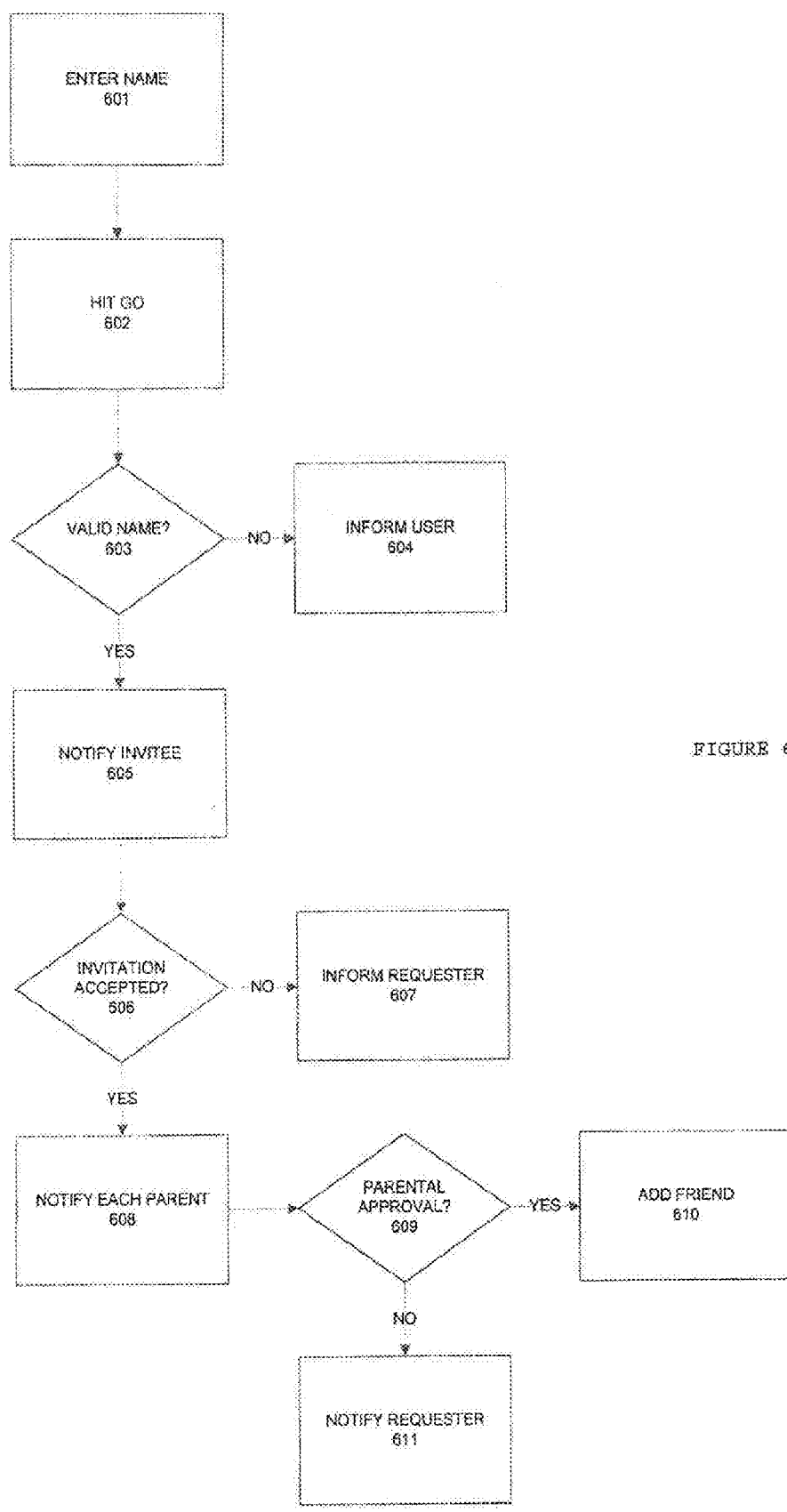
FIG. 6 is a flow diagram illustrating the addition of a friend in an embodiment of the system.

FIG. 6 is a flow diagram illustrating the operation of adding a friend in one embodiment of the system. At step 601 a user enters the user name of a potential friend. into the Add a Friend box 302. At step 602 the user hits "Go". At step 603 the system checks to see if the user name is a valid user name. If not, the system informs the user at step 604. If the user name is valid, the system notifies the potential friend at step 605 that someone is inviting them as a friend.

At step 606 the potential friend indicates acceptance or denial of the invitation. If denied, the requester is notified at step 607. If accepted, the parent of both the requester and the potential friend are notified of the request at step 608. At step 609 the system determines if the parent of each party has granted permission. If so, the potential friend is added to the My Friends list at step 610. If one or both parent has denied permission at step 609, the requester is notified at step 611.

Navigation Trail

One of the features of the system is the ability of a user to track their own navigation during a session. This captured navigation is referred to herein as a "navigation trail". The navigation trail can be used later by its originator to recreate the search and exploration of the user. The system logs all actions by a user in a file. The user can recover prior navigation trails and may name them if desired. The system presents the navigation trail as a numbered series of steps and/or as a scrollable collection of graphic representations of navigation steps from the trail. In one embodiment, the system includes clicks on links within a website so that the entire session can be recreated faithfully.

In operation the system caches the display and logs the mouse clicks and other navigational activity during a session. A linked list of this activity is formed as the child. explores. A default identification by user, date, and time is used to identify the trail but the child can optionally rename the trail at any time. In one embodiment, the user can identify a start and stop time for trail creation so that more specific trails can be generated that may prove more useful for the child. Because the trail is a file, it can be shared with other users. When a child has a particularly fun or interesting session, the user is able to share the same experience with another child but forwarding the trail to the other user.

Tandem Exploration

The system provides a feature that allows two or more children to share an exploration or web surfing experience simultaneously. The avatar of each child participating in the tandem exploration is displayed on all participants' screens. One of the children is designated as the leader and the remaining children are characterized as followers. In one embodiment instant messaging or text messaging is enabled for the participants. The leader is able to navigate on the shared screen while followers have navigation actions temporarily disabled. However, the rating capability is still active for each child, whether leader or follower. During the exploration, each child can rate the content that appears and those ratings can appear associated with their avatar during the tandem session. By communicating via instant messaging, the followers can offer navigation suggestions to the leader.

In one embodiment, each user can select an option to allow their sessions to be followed by one or more friends. This option is visible to other friends. In one scenario, a child will look at the information for another friend, see that the friend is online and permits following. The child can then elect to begin following that friend. When that occurs, the child's screen displays the other friends display, a chat mode is initiated, and the child follows the friend around during the friend's session. Friends can freely join and leave a tandem session as desired. When they leave, their avatar might disappear or present some indication that they are no longer in following mode.

Figure 7:
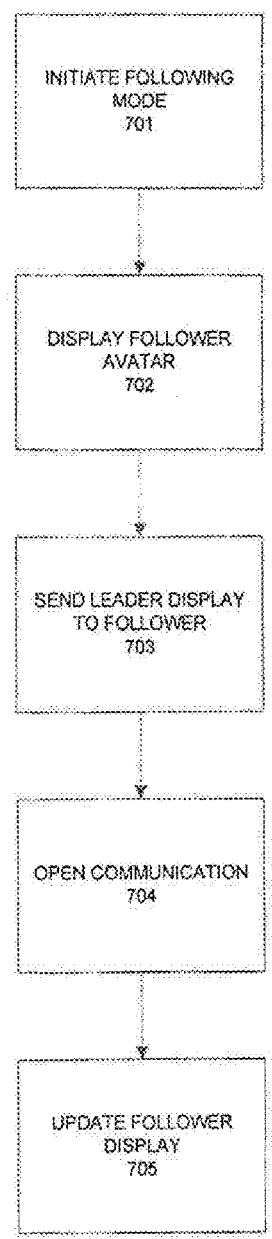
FIG. 7 is a flow diagram illustrating the system during a tandem session.

FIG. 7 is a flow diagram illustrating the system during a tandem session. AT step 701 a child notes that a friend permits following and initiates the following action. This may be accomplished by clicking on a link associated with the friend's avatar stating "Follow Me". At this point the child becomes a follower and the friend is the leader. At step 702 the system displays the avatar of the follower on the leader's display, with an indication that the follower is in following mode. At step 703 the system displays the leaders avatar and display on the followers screen. This may be in the entire screen space or it may be in a separate window on the display of the follower. This separate window may be enlarged or shrunk or otherwise resized as desired by the follower. At step 704 a communication channel is presented, such as instant messaging, chat, etc. At step 705, the system tracks navigation and other activity by the leader, and updates the tandem display of the follower accordingly. This continues until the leader ends the session or the follower decides to drop out of the following mode.

Thus, a method and apparatus for navigation and use of a computer network has been described.

What is claimed is:

1. A method for sharing network exploration comprising:
   enabling a follower at a second computer to follow a leader at a first computer during a network session;
   temporarily disabling navigation actions on the second computer;
   tracking all browser navigation to any of a plurality of web pages and mouse clicks of the leader on the first computer;
   reproducing all browser navigation to the plurality of web pages and mouse clicks on the second computer of the follower;
   displaying avatars of the leader and the follower at the first and second computers;
   providing display information of activity of the leader to the follower during the network session;
   creating a stored and replayable navigation trail of the leader that includes all navigation and mouse clicks of the leader during the network session, wherein the navigation trail can be replayed by the leader or follower at a later time.

2. The method of claim 1 further including providing an instant messaging communication link between the leader and the follower during shared network exploration.

3. The method of claim 1 wherein the follower can join or leave the shared exploration at any time.

4. The method of claim 1 where the leader can enable or disable shared exploration.

\* \* \* \* \*